United States Patent [19]

Forney

[11] 3,861,887

[45] Jan. 21, 1975

[54] PROCESS FOR CONTROLLING POLLUTION AND CONTAMINATION IN PAINT OR LACQUER SPRAY BOOTHS

[76] Inventor: Steven W. Forney, 1955 Teaneck Cir., Woxom, Mich. 48096

[22] Filed: Nov. 1, 1973

[21] Appl. No.: 411,679

[52] U.S. Cl............................. 55/19, 55/85, 55/89
[51] Int. Cl............................................ B01d 47/00
[58] Field of Search......... 98/115 SB; 55/19, 84, 85, 55/89, 240; 260/584 B

[56]  References Cited
UNITED STATES PATENTS

| | | | |
|---|---|---|---|
| 2,086,514 | 7/1937 | Saunders et al. | 55/85 X |
| 3,168,031 | 2/1965 | Wilhelmsson et al. | 98/115 SB |
| 3,173,879 | 3/1965 | Arnold et al. | 98/115 SB |
| 3,251,882 | 5/1966 | Kirckpatrick et al. | 260/584 B |
| 3,795,093 | 3/1974 | Gerhard et al. | 98/115 SB |

*Primary Examiner*—Charles N. Hart
*Assistant Examiner*—Richard W. Burks
*Attorney, Agent, or Firm*—Johnston, Keil, Thompson & Shurtleff

[57] ABSTRACT

Water used to wash the air in paint or lacquer spray booths in order to remove over-sprayed paint or lacquers is treated with a blend of polycationic water dispersible polymer and a water soluble salt of an amphoteric metal to reduce the tackiness of paint and lacquer solids and thereby reduce the tendency of over-sprayed paints and lacquers to adhere to walls, ceilings and floors of said spray booths and also to condition the paint and lacquer solids removed with the water so that they can be separated and the water recycled for further use in washing the air in the spray booth.

5 Claims, No Drawings

PROCESS FOR CONTROLLING POLLUTION AND CONTAMINATION IN PAINT OR LACQUER SPRAY BOOTHS

BACKGROUND

In the application of paints and lacquers to automobile bodies and other types of articles it is customary to carry out such operations in enclosed spray booths and to introduce into such spray booths a curtain of water to wash the air and to remove over-sprayed paints or lacquer solids. The water containing suspended solids is filtered or otherwise treated to separate the solids so that the water can be recycled.

This process involves many problems. Thus, the paint and lacquer solids are normally tacky and tend to adhere to the walls, ceilings and floors of the spray booths which makes it necessary to shut down the operation from time to time in order to clean the spray booths. The deposits which are formed on the walls, ceilings and floors of the spray booths are also subject to the growth of anaerobic corrosive bacteria (e.g., desulfovibrio) which generates corrosive and highly objectionable hydrogen sulfide.

The paint and lacquer solids which are washed away and form suspensions in the water that is removed from the spray booths present a disposal problem. In order to avoid contamination of the environment it is customary to separate these solids from the water and to recirculate the water but these solids are difficult to separate by the usual method of filtration.

It is therefore desirable to control pollution and contamination in paint or lacquer spray booths so as to prevent, as much as possible, the deposition of paint and lacquer solids on walls, ceilings and floors and to condition the sludge which is removed with the water so that it can be readily filtered and the water which forms the filtrate can be returned for use in the process.

OBJECTS

One of the objects of the present invention is to provide a new and improved process for controlling pollution and contamination in paint or lacquer spray booths in which the water used to wash the air in the spray booth and to remove over-sprayed paints or lacquers is conditioned by one or more additives which reduce the tackiness of paint and lacquer solids and thereby reduce the tendency of such solids to adhere to walls, ceilings and floors of paint and lacquer spray booths making it possible to operate such booths over a longer period of time before cleaning them which also reduces maintenance costs.

Another object of the invention is to provide a process of the type described in which paint and lacquer solids suspended in the water which is used to wash the air in spray booths are so conditioned that they can be recovered by filtration and the filtrate recycled in the process.

Another object of the invention is to provide a process of the type described characterized by deposit-corrosion control, longer booth runs, less maintenance, a more consistent effluent, lower plant treatment costs, lower microbiological activity, and the production of a sludge from the paint and lacquer solids which is more readily dewatered by filtration or otherwise than has been the case in conventional commercial operations. Other objects will appear hereinafter.

BRIEF SUMMARY OF THE INVENTION

In accordance with the invention pollution and contamination in paint or lacquer spray booths in which water is used to wash the air in the spray booth and to remove over-sprayed paint or lacquer solids are controlled by adding to the water a blend of a polycationic water dispersible polymer and a compatible water soluble salt of an amphoteric metal, preferably while maintaining a pH within the range of 7.5 to 10.0, the quantity of said blend being sufficient to reduce the tackiness of paint and lacquer solids and to condition such solids so that they can be separated from the water, e.g., by filtration, so that the water can be returned for recycling in the process.

DETAILED DESCRIPTION OF THE INVENTION

In a process of the type described the conventional paint or lacquer spray booth is a closed room where the object to be painted or lacquered is sprayed with paint or lacquer and the air is washed with a curtain or spray of water so as to remove over-sprayed paints of lacquers in the form of suspensions of paint of lacquer solids. These suspensions can be disposed of as waste materials but in order to avoid contamination of the environment, it is desirable to separate the solids and to reuse the water. Unfortunately, the paint or lacquer solids are quite tacky and despite air washing with water, they tend to build up in the form of deposits on the walls, ceilings and floors of the spray booths. In a typical operation a run might last for two weeks and at the end of that time the spray booth has to be emptied and cleaned. The cleaning might require 200 man hours. Furthermore, the sludge which is produced during the operation of the spray booth as a result of the combination of the water with the paint or lacquer solids is usually very difficult to de-water by the customary filtration methods. In addition, the accumulation of the paint or lacquer deposits on the walls, ceilings and floors of the spray booths provides a suitable environment for anaerobic corrosive bacteria.

In the practice of the present invention it has been found that the addition of the blend of polycationic water dispersible polymer and compatible salt of an amphoteric metal to the water used in washing the air in the spray booth reduces the tackiness of paint and lacquer solids, thereby reducing the tendency of over-sprayed paints and lacquers to adhere to walls, ceilings and floors of the spray booths and at the same time conditions the solids so that they can be readily removed from the water after the suspension of solids in water has been removed from the spray booths.

The separation of the solids from the water can be effected by vacuum filtration or in any other suitable manner and the filtrate can then be used over again in the process.

The polycationic water dispersible polymer which is employed in the practice of the invention is a polyelectrolyte of a well known type having a linear carbon chain to which is attached a plurality of cationic groups such as, for example, amino and quaternary amino groups. Polymers which have been found to be effective usually have a molecular weight within the range of 500 to 5,000. Examples of such polymers which are compatible with water soluble salts of amphoteric metals are the polycondensates having a molecular weight of at least 1000 of epichlorohydrin and precondensates of polyalkylene polyamines and polyoxyalkylene glycol chlorides as disclosed in U.S. Pat. No. 3,251,882, the disclosure of which is incorporated herein by reference, and polyethylene polyamines as disclosed in U.S. Pat. No. 3,751,474, the disclosure of which is incorporated herein by reference. Other suitable polycationic linear polymers are condensation products of ammonia and ethylene dichloride and condensation products of ethylene diamine and ethylene dichloride and the quaternary salts thereof as disclosed in U.S. Pat. No. 3,372,129, the disclosure of which is incorporated herein by reference. Suitable polycationic linear polymers for the purpose of the invention are also obtained by the polymerization of polyethylene glycol and hexamethylenediamine. Similar polycationic water dispersible polymers having a linear main carbon chain with a plurality of cationic groups attached thereto which are compatible with water soluble salts of amphoteric metals can be employed for the purpose of the invention. Also, the linear polyamine polymers of low molecular weight disclosed in U.S. Pat. No. 3,468,818 may be used in the practice of the present invention, the disclosure of which is incorporated herein by reference.

The water soluble salts of amphoteric metals which are employed for the purpose of the invention are strong electrolytes and include, for example, zinc chloride, ferric chloride, lanthanum chloride and aluminum chloride.

The polycationic polymer is blended with the electrolyte salts of the amphoteric metal preferably in a weight ratio within the range of 0.2 to 3 parts by weight of the electrolyte salt per part of the polycationic polymer.

Blends of such electrolyte salts and polycationic polymers have heretofore been used in breaking oil-in-water emulsions and their effectiveness for this purpose may contribute to their effectiveness in the practice of the present invention. However, for the purpose of the present invention it is desirable to carry out the process by adjusting the pH of the water containing the blend of polycationic water dispersible polymer and electrolyte salt to a pH within the range of 7.5 to 10.0, preferably 7.5 to 9.5. This is accomplished by adding any suitable alkaline material such as an alkali metal hydroxide, e.g., sodium hydroxide or potassium hydroxide. Usually it is preferable to employ sodium hydroxide because it is the least expensive. Other alkalis can be used but alkaline compounds that tend to form insoluble salts are less desirable.

The invention is applicable to the treatment of water sprays in paint or lacquer spray booths regardless of the type of paint or lacquer. Thus the paint or lacquer may be a water based paint or an oil based paint which can include acrylic resins, rubber latex type polymers, nitrocellulose, polyester resins, urea-formaldehyde resins, melamine resins, and/or polyurethane resins.

The quantity of the blend of electrolyte salt and polycationic water dispersible polymer added to the water can vary somewhat depending upon the water analysis and other factors but it is usually within the range of 100 parts per million (ppm) to 200 ppm. The amounts should be sufficient to reduce the tackiness of paints and lacquers and thereby reduce the tendency of over-sprayed paints and lacquers to adhere to walls, ceilings and floors of spray booths and it should also be sufficient to condition paint and lacquer solids removed with the water so that they can be separated from the water by settling, filtration or in some other manner and the water returned for recirculation in the process.

In a process of this type it is usually customary to pump the water through conduits to the spray booth and the blend of electrolyte and polycationic polymer can be introduced into the water at any suitable point, preferably just ahead of or after the pump.

The invention will be illustrated but is not limited by the following example in which the quantities are given in parts by weight unless otherwise indicated.

EXAMPLE

The process of the invention was carried out in the spray lacquer booth of an automobile body plant using a system in which water was sprayed into the booth to remove over-sprayed lacquer solids, the suspension of lacquer solids in water was treated outside of the booth to separate the lacquer solids and the water was then recirculated through a pump to the lacquer booth. In this process water was recirculated at the conventional rate within the range of 3,000 to 10,000 gallons per minute.

Approximately 100 to 200 ppm of a blend of zinc chloride and a polycationic polyelectrolyte (Nalco 8723) of the type disclosed in U.S. Pat. No. 3,251,882 containing approximately 2 parts by weight of zinc chloride per part of a polycationic polymer derived from epichlorohydrin, a polyalkylene polyamine and a polyoxyalkylene glycol chloride was added to the water at the pump used to pump the water into ths spray booth for the purpose of washing the air and to remove over-sprayed lacquer solids. A suspension of lacquer solids in water was withdrawn from the spray booth and pumped to a settling tank where it formed a sludge. After this sludge had attained a minimum of about 8% solids it was pumped to a vacuum filter and the filtrate was recycled through the pump to the spray booth.

Corrosion tests were made and microbiological tests were made to determine the corrosive effects of the treatment and the microbiological effects. It was found that the treatment produced minimal corrosive effects and that there were little, if any, microbiological changes of an adverse nature.

In subsequent tests an improvement, particularly with respect to corrosion control, was obtained by adding caustic soda to the wash water in sufficient amount to produce a pH within the range of 7.5 to 9.5.

It was also found to be desirable to condition the sludge in the settling tank by adding a small amount, for example, 100–200 ppm of a water dispersible coagulating type polymer such as, for example, a polyacrylamide or an acrylic acid-acrylamide polymer.

In tests that were made to compare the practice of the present invention with conventional methods of treatment it was found that in a treatment of the water to the spray booth being used commercially where the run lasted for 2 weeks after which the booth was emptied and cleaned, the cleaning required 200 man days whereas a run of equal time carried out in accordance with the present process required 5 man days to clean the booth.

Constant monitoring of water quality and microbiological activity which was used to determine the effectiveness of the treatment demonstrated that the process of the present invention would control suspended solids and actually reduce the solids with time whereas a previously used commercial process caused the treated booth to saturate with solids, thus increasing the probability of booth deposits.

Spray booths treated in accordance with the present invention remained relatively clean and of low microbiological activity while spray booths treated by a previously commercial method were subject to high deposits and corrosion due to the high counts of corrosive and deposit-forming bacteria.

The invention is hereby claimed as follows:

1. In a process for controlling pollution and contamination in paint or lacquer spray booths in which water is used to wash the air in the spray booth and to remove over-sprayed paints or lacquers and solids are removed from the water which is then recirculated for further use in washing the air in the spray booth, the improvement which comprises adding to said water a quantity of a blend of a water soluble electrolyte salt of an amphoteric metal and a polycationic water dispersible polymer, said quantity being sufficient to reduce the tackiness of paints and lacquers and thereby reduce the tendency of over-sprayed paints and lacquers to adhere to walls, ceilings and floors of said spray booths, and said polymer also being effective to condition paint and lacquer solids removed with said water so that they can be separated from the water which is then returned for recirculation in the process.

2. A process as claimed in claim 1 in which the pH of said water containing said blend is adjusted to a pH within the range of 7.5 to 10.

3. A process as claimed in claim 1 in which said polymer has a linear chain containing carbon atoms to which are attached cationic groups selected from the group consisting of amino and quaternary amino groups.

4. A process as claimed in claim 1 in which said electrolyte salt is zinc chloride.

5. A process as claimed in claim 1 in which said polymer has an average molecular weight within the range of 500 to 5,000.

* * * * *

UNITED STATES PATENT OFFICE
CERTIFICATE OF CORRECTION

PATENT NO. : 3,861,887
DATED : January 21, 1975
INVENTOR(S) : STEVEN W. FORNEY

It is certified that error appears in the above-identified patent and that said Letters Patent are hereby corrected as shown below:

[73] Assignee: Nalco Chemical Company, Chicago, Illinois.

Signed and sealed this 15th day of July 1975.

(SEAL)
Attest:

RUTH C. MASON
Attesting Officer

C. MARSHALL DANN
Commissioner of Patents
and Trademarks